United States Patent Office 2,975,136
Patented Mar. 14, 1961

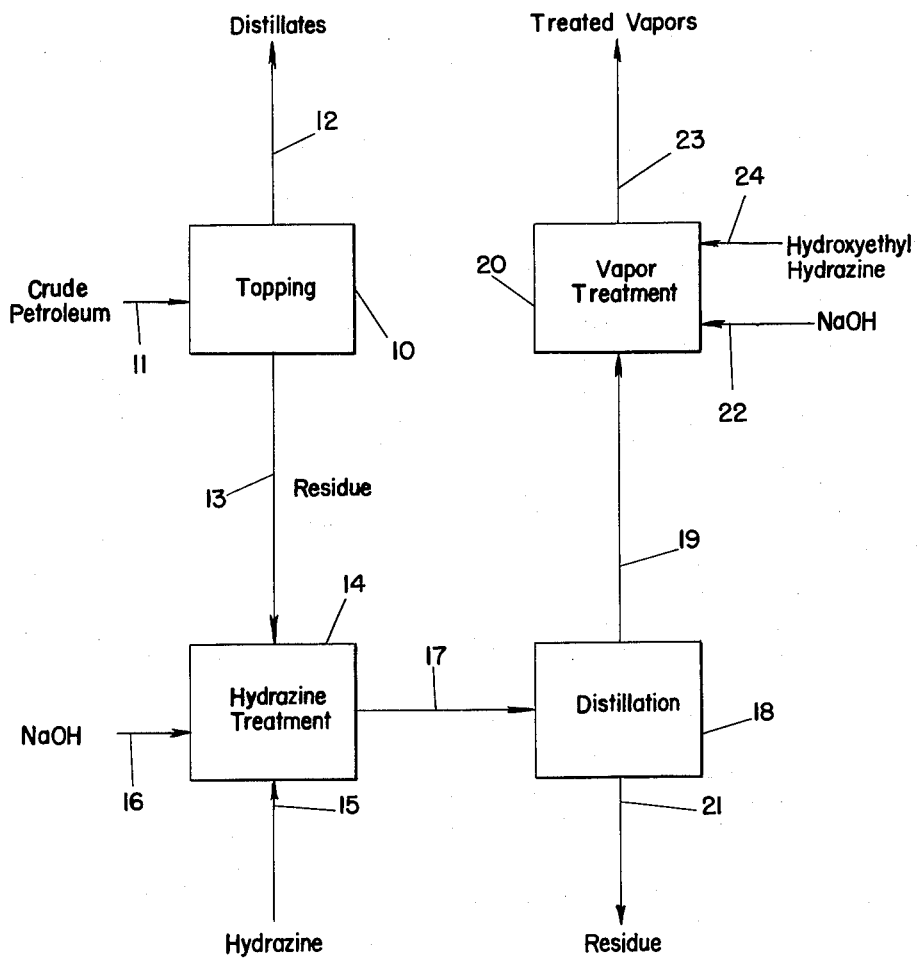

2,975,136
PROCESS FOR IMPROVING THE COLOR STABILITY OF HYDROCARBONS WITH HYDRAZINES

Charles L. Thomas, Swarthmore, Archibald P. Stuart, Media, and Habet M. Khelghatian, Springfield, Pa., assignors to Sun Oil Company, Philadelphia, Pa., a corporation of New Jersey Filed Jan. 17, 1956, Ser. No. 559,725

5 Claims. (Cl. 252—51.5)

This invention relates to producing hydrocarbons having improved properties including color stability.

The color stability of hydrocarbons such as petroleum products is an important property with respect to many uses thereof, and many products as ordinarily produced have color stability which is unsatisfactory, because of the presence of various constituents, believed to be mainly nonhydrocarbon materials, which cause the hydrocarbons to discolor when subjected to conditions of storage and use.

According to one embodiment of the present invention, petroleum products are rendered more color stable by reacting certain constituents thereof with hydrazine or specified derivatives thereof. The hydrazine treating agent may react with oxygen dissolved in the oil or with constituents of the oil which would otherwise produce color degradation. In any event, the result obtained avoids the formation of the ultimate products which normally cause poor color characteristics in petroleum products.

The invention will be further described with regard to treatment of petroleum products. However, it is to be understood that other hydrocarbon-containing materials such as shale oil can also be treated according to the invention.

The hydrazine treating agent which is employed comprises a compound having the following formula:

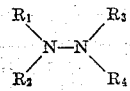

where $R_1$ and $R_2$ are each selected from the group consisting of hydrogen, hydrocarbon radicals, acyl radicals, carbamyl radicals, and thiocarbamyl radicals, and $R_3$ and $R_4$ are each selected from the group consisting of hydrogen, alkyl radicals, hydroxyalkyl radicals and halophenyl radicals. Examples of suitable hydrazine treating agents are: hydrazine, methyl hydrazine, symmetrical dimethyl hydrazine, asymmetrical dimethyl hydrazine, asymmetrical methyl ethyl hydrazine, asymmetrical diethyl hydrazine, trimethyl hydrazine, octyl hydrazine, phenyl hydrazine, asymmetrical diphenyl hydrazine, asymmetrical methyl phenyl hydrazine, N-cyclohexyl hydrazine, acetyl hydrazine, semicarbazide, thiosemicarbazide, N-ethoxy hydrazine, N-(chlorophenyl) hydrazine, etc. Preferably, the hydrazine treating agent according to the invention contains not more than 50 carbon atoms in the molecule, and more preferably not more than 15 carbon atoms. Preferably $R_1$ and $R_2$, if hydrocarbon radicals, are saturated hydrocarbon radicals, rather than aromatic or olefinic radicals. Preferably, at least one of the radicals, $R_1$, $R_2$, $R_3$ or $R_4$ is hydrogen.

The contacting of petroleum products with a hydrazine treating agent can be carried out at any suitable temperature within the approximate range from atmospheric temperature to 650° F. Preferably the temperature is within the approximate range from 150° F. to 450° F. At the higher contacting temperatures, the hydrazine treating agent employed is preferably one which has relatively high molecular weight, in order that the treating agent does not have excessive volatility at the temperature employed. It is not essential however that the hydrazine treating agent be in liquid phase at the contacting temperature, since the invention contemplates the contacting of petroleum products with a hydrazine treating agent in vapor phase, in cases where the hydrazine treating agent employed is capable of existing in the vapor state.

The amount of hydrazine or derivative thereof (anhydrous basis) is preferably within the approximate range from 0.005 to 0.5 weight percent based on the petroleum treated. However, larger amounts may be needed where the petroleum contains particularly large amounts of constituents which it is desired to react with the hydrazine treating agent.

The time required for reaction between hydrazine treating agent and constituents of the petroleum treated depends on the temperature and other conditions employed. At the preferred elevated temperatures, reaction may take place in a minute or even less, and it will usually be unnecessary to prolong the reaction beyond one hour. When lower temperatures are used, longer reaction times, e.g. 10 hours or more, may be needed. Any water formed in the reaction, and perhaps the excess treating agent also, can be removed directly upon completion of the reaction, or at any convenient later time.

When, as subsequently more fully described, hydrazine or a derivative thereof is used as a stabilizing additive for petroleum, the period of time involved may be considerably longer. Thus, it may be desired to have the additive in the petroleum material during an entire storage or transportation period, with removal of any water formed and perhaps the excess additive also, only at the end of the storage or transportation period.

In cases where the hydrazine treating agent reacts with nonhydrocarbon constituents of the petroleum material, water is often produced as a product of the reaction. It is generally desirable, when this is the case, to remove the water formed from the petroleum product by any of the conventional methods for removal of water from petroleum fractions, e.g. by blowing with air, etc. When such means are used to remove water from the treated petroleum product, excess hydrazine treating agent, if any, may also be at least partially removed. This is particularly true in the case of hydrazine itself, which has a boiling point not greatly different from that of water.

The present invention can be carried out, in one embodiment, by contacting a petroleum fraction with an excess of hydrazine treating agent in liquid phase, thereby to produce upon settling of the products of the treating, a two-phase system including a treated petroleum phase and a hydrazine treating agent phase. The latter phase may contain at least some of the reaction products produced in the treating, and may also contain some of the more highly polar hydrocarbon constituents which were extracted by the hydrazine treating agent. In such operation, the amount of hydrazine treating agent employed may greatly exceed the amount of petroleum treated, the exact amount to be used depending on the amount of petroleum constituents desired to be extracted. If desired, a modifying solvent such as water can be employed to reduce the miscibility of the hydrazine treating agent with the petroleum fraction.

In one embodiment of the process according to the invention, the contacting of petroleum with hydrazine treating agent can be carried out in the presence of an alkali metal hydroxide, for example aqueous caustic soda. In some cases, the hydrazine treating agent increases the ability of the alkali metal hydroxide to react with undesirable constituents of the petroleum fraction, in order that such constituents can be removed therefrom. If desired, the petroleum fraction thus treated can be distilled in the presence of the alkali metal hydroxide and hydrazine treating agent. It has been found that distillates can be obtained in this manner which have better color stability than those obtained by distillation in the presence of alkali metal hydroxide without a hydrazine treating agent.

In one embodiment of the invention, hydrazine or a derivative thereof as previously defined can be employed as an additive for petroleum products, to improve the color stability and oxidation resistance of the products. Thus, for example, 0.005 to 0.5 weight percent of hydrazine or derivative (anhydrous basis) can be employed as a lubricating oil additive. In gasoline, the amounts used are conveniently in the approximate range from 10 p.p.m. to 0.05 weight percent. It has been found for example that 10 p.p.m. of hydrazine is an effective stabilizer for catalytically cracked gasoline. It is not essential, in this embodiment of the invention, that water formed by reaction of hydrazine or derivative thereof with constituents of the petroleum, be removed from the petroleum. However, such removal will be preferable in many instances where the presence of water in the product would produce an undesirable haze.

The invention will be further described with reference to the attached drawing, which is a schematic flow sheet of one embodiment of the process according to the invention.

Referring to the drawing, crude petroleum is introduced into topping zone 10 through line 11, and a conventional topping operation is performed to obtain distillates removed as indicated by line 12. The residue, or reduced crude, is introduced through line 13 into hydrazine treating zone 14, wherein it is contacted with hydrazine, e.g. an aqueous solution thereof, introduced through line 15. If desired, the treatment can be carried out in the presence of sodium hydroxide introduced, for example as aqueous caustic soda, through line 16. The various materials can be agitated together by suitable conventional means in zone 14, for a period of about one hour, for example, at a temperature of about 150° F. The entire mixture is then introduced through line 17 into distillation zone 18. Evolved lubricating oil vapors are withdrawn through line 19 and introduced into vapor treatment zone 20. Residue from the distillation is withdrawn through line 21.

Beta-hydroxyethyl hydrazine is introduced into zone 20 through line 24, and aqueous caustic soda is introduced through line 22. Alternatively, if desired, the hydroxyethyl hydrazine and aqueous sodium hydroxide can be mixed and introduced together into zone 20. The lubricating oil vapors are refined by contact with the sodium hydroxide and hydroxyethyl hydrazine, acidic constituents of the vapors being neutralized by the sodium hydroxide, and reaction occurring between the hydroxyethyl hydrazine and nonhydrocarbon constituents of the vapors. The hydroxyethyl hydrazine is vaporized to a substantial extent under the temperature conditions in the zone 20, and the hydroxyethyl hydrazine vapors are removed along with the treated vapors through line 23. The vapors withdrawn through line 23 can then be subjected to rectification by conventional means not shown to produce various distillate fractions. The hydroxyethyl hydrazine withdrawn through line 23 will become incorporated in some of these distillate fractions, depending on their boiling ranges. All of the distillates obtained are beneficially affected by the contact with hydroxyethyl hydrazine and sodium hydroxide in zone 20, and those distillates which contain hydroxyethyl hydrazine after condensation are beneficially stabilized against degradation by the presence of hydroxyethyl hydrazine. If desired, some or all of the distillates obtained can be further contacted with a hydrazine treating agent either at the temperatures at which they are withdrawn from the distillation column, or at other suitable temperature.

Although the treatment with hydrazine in zone 14 and the treatment with hydroxyethyl hydrazine in zone 20 have previously been disclosed in conjunction with each other, it is to be understood that either treatment could be performed in the absence of the other. Also, hydroxyethyl hydrazine or other hydrazine treating agent according to the invention could be employed in zone 14 in place of hydrazine. Also, other hydrazine treating agents could be employed in zone 20 in place of hydroxyethyl hydrazine, provided that the volatility of the hydrazine treating agent is not too great.

Petroleum fractions generally are suitable for stabilization or treatment according to the invention. Thus, crude petroleum, reduced crude, various distillates ranging from gasoline to lubricating oils and waxes, etc. can be advantageously stabilized or treated according to the present invention. Other hydrocarbon materials, such as shale oil and fractions and conversion products thereof, are also advantageously stabilized or treated according to the invention.

The following examples illustrate the invention:

Example I

A Coastal petroleum crude was topped as indicated in the drawing to obtain a 59 percent reduced crude. 1.5 volume percent of 50° Bé. caustic soda was added to the reduced crude in naphtha solution, and the resulting mixture was held at 150° F. for 17 hours. In one instance, this treatment was carried out in the presence of 0.05 volume percent hydrazine, and in a second instance hydrazine was not present during the treatment. In each instance, the product of the treatment was stripped of naphtha and vacuum distilled to obtain a plurality of distillates, each constituting 10 percent of the charge to the distillation and having endpoint as indicated in the table below. Each distillate was tested for color stability by measuring the N.P.A. color thereof before and after subjection to a temperature of 221° F. for 16 hours in an atmosphere of air.

The following table shows the results which were obtained:

| Cut No. | Hydrazine Present | | | Hydrazine Absent | | |
|---|---|---|---|---|---|---|
| | End Point, °F. | Initial Color | Aged Color | End Point, °F. | Initial Color | Aged Color |
| 1 | | | | | | |
| 2 | | | | | | |
| 3 | 640 | 1¼ | 1¼ | 689 | 1¼ | 1¼ |
| 4 | 718 | 1½ | 1½ | 715 | 1½ | 1½ |
| 5 | 771 | 1¾ | 1¾ | 781 | 1¾ | 2 |
| 6 | 799 | 2¼ | 2¼ | 814 | 2¼ | 3 |
| 7 | 837 | 2¾ | 2¾ | 858 | 2¾ | 3 |
| 8 | 866 | 3½ | 3½ | 929 | 3¾ | 7¼ |
| 9 | 949 | 4¾ | 5½ | | | |

The end points of the various cuts do not correspond closely for the respective distillations; the discrepancy is probably attributable to different degrees of removal of naphtha from the respective materials prior to the distillation.

This example shows that the presence of hydrazine substantially improves the color stability of lubricating oil products obtained by treatment of reduced crude with caustic soda at a temperature of 150° F. for 17 hours, followed by vacuum distillation to obtain lubricating oil distillates.

Example II

Petroleum lubricating oil was stabilized by adding thereto a minor amount of a 54.4% aqueous solution of hydrazine. The lubricating oil employed was a naphthenic oil which had not been solvent refined, and which had the following properties: Saybolt Universal viscosity at 100° F., 547 seconds; Saybolt Universal viscosity at 210° F., 53.19 seconds; flash point 375° F.; fire point 430° F.; A.P.I. gravity 20.0. The oil had an initial color of 21.4, as determined by optical density measurements (absorbance at 525 millimicrons, multiplied by a factor of 100).

The oil containing various amounts of the aqueous hydrazine solution was aged at 220° F. for 16 hours, and the O.D. colors before and after aging were compared with the O.D. color before and after aging for the same oil containing no aqueous hydrazine. The following table shows the results obtained.

| Aqueous Hydrazine Conc'n, Wt. Percent | Color, O.D. | |
|---|---|---|
| | Initial | Aged |
| 0 | 21.4 | 32.2 |
| 0.01 | 18.8 | 27.8 |
| 0.05 | 15.9 | 22.1 |
| 0.10 | 16.1 | 20.3 |

This example shows that aqueous hydrazine is capable of providing substantial improvement of color and inhibition against color degradation of lubricating oil. Thus, aqueous hydrazine can be added to a lubricating oil prior to storage of the latter, in order to prevent excessive discoloration during the subsequent storage. Upon completion of the storage period, it is generally desirable to remove from the oil the water which was introduced with the original solution, and also any water formed during the storage period.

*Example III*

Petroleum lubricating oil generally similar in properties to that employed in Example II was stabilized against color degradation by incorporation of anhydrous hydrazine in the oil. The conditions of testing were generally similar to those employed in Example II, and the following table shows the results obtained:

| Anhydrous Hydrazine Conc'n, Wt. Percent | Color, O.D. | |
|---|---|---|
| | Initial | Aged |
| 0 | 19.1 | 33.8 |
| 0.025 | | 27.5 |
| 0.05 | | 22.8 |
| 0.10 | | 20.7 |

This example shows that anhydrous hydrazine is also capable of providing substantial inhibition against color degradation in lubricating oil. After a storage period as discussed in Example II, it will generally be desirable to remove from the lubricating oil any water which has been formed during storage.

Comparison of Examples II and III indicates a synergistic action of hydrazine and water. Thus, in Example II, 0.0272% of hydrazine and 0.0228% of water gave an aged color of 22.1, whereas in Example III, only slightly less (0.025%) anhydrous hydrazine gave an aged color of 27.5.

*Example IV*

Petroleum lubricating oil generally similar in properties to that employed in Example II was stabilized against color deterioration by incorporating therein minor amounts of reaction products obtained by reacting ethylene oxide with hydrazine. The reaction products contained about 80% of monohydroxyethyl hydrazine, and small amounts of other reaction products of ethylene oxide with hydrazine. The procedure of testing was generally similar to that employed in Example II, and the hydrazine derivatives provided inhibition against color degradation generally comparable to that obtained in Example II. If desired, hydroxyethyl hydrazine can be obtained in situ by adding ethylene oxide and hydrazine to the material to be treated under conditions promoting formation of hydroxyethyl hydrazine and reaction of the latter with constituents of the treated material.

*Example V*

Petroleum lubricating oil generally similar to that employed in Example II was stabilized against color deterioration by incorporating therein minor amounts of symmetrical dimethyl hydrazine. The procedure of testing was generally similar to that of Example II, and the dimethyl hydrazine provided inhibition against color degradation generally comparable to that obtained in Example II. The lubricating oil, after the aging period, did not contain a water haze, and in this respect differed from the aged lubricating oils obtained with other hydrazine treating agents. Accordingly, in the case of symmetrical dimethyl hydrazine, and also other hydrazine derivatives not having a primary amino group, it is not necessary to remove water from the oil after the aging period.

The hydrazine treating agent employed according to the invention can be either anhydrous or aqueous. The use of aqueous treating agents generally provides better results with regard to color stabilization than the use of an anhydrous treating agent containing the same amount of hydrazine or derivative as the aqueous treating agent. Hydrazine hydrate is a particularly suitable form of aqueous hydrazine for use according to the invention.

The process of the invention is advantageous in that it permits the use, to improve petroleum products, of hydrazine treating agents which have too low solubility in petroleum to be suitable as ordinary additives. The solubility is not a controlling feature since it is possible to react a hydrazine treating agent with petroleum constituents according to the process of the invention, even though the hydrazine treating agent is used in amounts larger than those which are soluble. Furthermore, elevated treating temperatures, where used, increase the solubility of the hydrazine treating agent in petroleum over the solubility at ordinary temperatures.

*Example VI*

Catalytically cracked gasoline was inhibited against oxidation, color degradation and gum formation by incorporation therein of 10 parts per million of hydrazine, added as a 54.4 percent aqueous solution. The gasoline was aged for 3 weeks at ambient temperature in an atmosphere of air, and the following table shows the Saybolt color and A.S.T.M. gum rating of the gasoline after aging, as compared with the same gasoline containing no additive. On the Saybolt color scale, 30 is water white.

| | Saybolt color | A.S.T.M. gum |
|---|---|---|
| No additive | 14 | 5.2 |
| 10 p.p.m. of aqueous hydrazine | 27 | 3 |

This table shows that aqueous hydrazine is effective, though used in very small amounts, to provide improved color stability and gum rating of catalytic gasoline.

Aqueous hydrazine is also effective in reducing the color degradation often caused by the use of conventional gum inhibitors and sweetening additives such as phenylene diamine. The following table shows results obtained after 3 weeks' aging with catalytic gasoline similar to that discussed above:

Saybolt color
No additive _____ 14
32 p.p.m. of phenylene diamine _____ 2
32 p.p.m. of phenylene diamine and 50 p.p.m. of aqueous hydrazine _____ 18

This table shows that aqueous hydrazine effectively counteracts the color degrading tendency of phenylene diamine.

The invention contemplates the use of hydrazine or derivatives as defined herein in conjunction with other additives comprising aromatic compounds having amino groups in the molecule, but not having the characteristic nitrogen-to-nitrogen linkage of hydrazine and derivatives, which other additives, when used in the absence of hydrazine or derivative, cause color degradation of the petroleum fraction to which they are added. In such use, the hydrazine or derivative provides a beneficial counteracting of the color degrading tendency of the other additive. Penylene diamine, N,N' - dimethyl-p-phenylene diamine, N,N'-di-secondary butyl-p-phenylene diamine, and N,N'-di-secondary hexyl-p-phenylene diamine, aniline, toluidine, xylidine, ethyl anilines, cumidines, etc. are examples of aromatic amino additives with which hydrazine or derivatives can advantageously be used.

In copending application Serial No. 726,058, filed April 3, 1958, as a continuation-in-part of the present application, petroleum lubricating oil compositions containing hydrazine and certain derivatives thereof are claimed.

The invention claimed is:

1. Process for improving the color stability of hydrocarbon material which comprises contacting a normally liquid petroleum hydrocarbon fraction with a hydroxyalkyl hydrazine containing at least one hydrogen atom attached to a nitrogen atom in the molecule, thereby to react the hydroxyalkyl hydrazine with constituents of the hydrocarbon material which normally cause poor color stability, and separating the reaction products from the treated fraction.

2. Process according to claim 1 wherein the product of such contacting is distilled to obtain distillates having improved color stability.

3. Process according to claim 1 wherein the amount of said treating agent is within the approximate range from 0.005 to 0.5 weight percent based on said hydrocarbon fraction.

4. Process for improving the color stability of hydrocarbon material which comprises contacting a normally liquid petroleum fraction with added alkali metal hydroxide and a treating agent selected from the group consisting of hydrazine, alkyl hydrazines and hydroxyalkyl hydrazines, said treating agent containing at least one hydrogen atom attached to a nitrogen atom in the molecule, separating the treated hydrocarbon material from excess alkali metal hydroxide, thereby to obtain a treated hydrocarbon material having superior color stability to that of a treated hydrocarbon material obtained by the same procedure in the absence of said treating agent.

5. Process for improving the color stability of hydrocarbon material which comprises contacting a normally liquid petroleum hydrocarbon fraction with added water and a treating agent selected from the group consisting of hydrazine, alkyl hydrazines and hydroxyalkyl hydrazines, said treating agent containing at least one hydrogen atom attached to a nitrogen atom in the molecule, thereby to react the treating agent with constituents of the hydrocarbon material which normally cause poor color stability, and to obtain a treated hydrocarbon material having superior color stability to that of the original hydrocarbon material.

References Cited in the file of this patent

UNITED STATES PATENTS

| | | |
|---|---|---|
| 1,906,044 | Burk | Apr. 25, 1933 |
| 1,958,744 | Cross | May 15, 1934 |
| 2,027,394 | McMullan | Jan. 14, 1936 |
| 2,062,675 | Rather | Dec. 1, 1936 |
| 2,304,242 | Cloud | Dec. 8, 1942 |
| 2,328,190 | Burk et al. | Aug. 31, 1943 |
| 2,353,690 | Clarkson et al. | July 18, 1944 |
| 2,508,617 | Mastin | May 23, 1950 |
| 2,589,450 | Stanton | Mar. 18, 1952 |
| 2,712,556 | Darling | July 5, 1955 |
| 2,729,690 | Oldenburg | Jan. 3, 1956 |

FOREIGN PATENTS

| | | |
|---|---|---|
| 423,938 | Great Britain | Feb. 11. 1935 |

OTHER REFERENCES

"The Chemistry of Hydrazines," John Wiley and Sons, Inc. 1951, pages 226–227.